United States Patent
Suzuki et al.

(10) Patent No.: US 11,643,114 B2
(45) Date of Patent: May 9, 2023

(54) INFORMATION PROCESSING DEVICE, INFORMATION PROCESSING METHOD AND INFORMATION PROCESSING PROGRAM

(71) Applicant: TOYOTA JIDOSHA KABUSHIKI KAISHA, Toyota (JP)

(72) Inventors: Koichi Suzuki, Miyoshi (JP); Toru Nishitani, Nisshin (JP); Jun Usami, Toyota (JP); Minami Yoda, Tokyo (JP); Kensuke Koike, Nisshin (JP); Tsuyoshi Ogawa, Okazaki (JP); Yohei Tanigawa, Toyota (JP)

(73) Assignee: TOYOTA JIDOSHA KABISHIKI KAISHA, Toyota (JP)

( * ) Notice: Subject to any disclaimer, the term of this patent is extended or adjusted under 35 U.S.C. 154(b) by 242 days.

(21) Appl. No.: 16/787,637

(22) Filed: Feb. 11, 2020

(65) Prior Publication Data
US 2020/0290650 A1 Sep. 17, 2020

(30) Foreign Application Priority Data
Mar. 15, 2019 (JP) .............................. JP2019-048580

(51) Int. Cl.
*B60W 60/00* (2020.01)
*G07C 5/02* (2006.01)
(Continued)

(52) U.S. Cl.
CPC ................ *B60W 60/00256* (2020.02); *B60W 60/00253* (2020.02); *G05D 1/0088* (2013.01);
(Continued)

(58) Field of Classification Search
None
See application file for complete search history.

(56) References Cited

U.S. PATENT DOCUMENTS

| 8,019,468 B2 * | 9/2011 | Hayashi ................. G06Q 10/08 700/228 |
| 2015/0073842 A1 * | 3/2015 | Aljabarti ................ G06Q 10/02 705/5 |

(Continued)

FOREIGN PATENT DOCUMENTS

| JP | 6164599 B1 | 7/2017 |
| JP | 2018012451 A * | 1/2018 |

(Continued)

*Primary Examiner* — Abdhesh K Jha
(74) *Attorney, Agent, or Firm* — Sughrue Mion, PLLC

(57) ABSTRACT

The disclosure is an information processing device that manages an operation of an autonomous vehicle having a loading space in which a parcel is loaded. The information processing device includes a control unit that executes: acquiring operation plan information including a route along which the autonomous vehicle travels when the autonomous vehicle delivers the parcel, and a delivery time for the parcel; and acquiring vacant space information based on the operation plan information, the vacant space information including a traveling section where a vacant space is generated in the loading space of the autonomous vehicle, a time when the vacant space is generated in the loading space of the autonomous vehicle, and the size of the vacant space that is generated in the loading space of the autonomous vehicle.

8 Claims, 7 Drawing Sheets

(51) Int. Cl.
*G07C 5/08* (2006.01)
*G05D 1/02* (2020.01)
*G07C 5/00* (2006.01)
*G05D 1/00* (2006.01)

(52) U.S. Cl.
CPC ........... *G05D 1/0212* (2013.01); *G07C 5/008* (2013.01); *G07C 5/02* (2013.01); *G07C 5/085* (2013.01); *B60W 2556/45* (2020.02); *B60W 2756/10* (2020.02); *G05D 2201/0213* (2013.01)

(56) References Cited

U.S. PATENT DOCUMENTS

| | | | |
|---|---|---|---|
| 2020/0019158 A1* | 1/2020 | Kang | G05D 1/0027 |
| 2020/0050198 A1* | 2/2020 | Donnelly | G01C 21/343 |
| 2020/0149902 A1 | 5/2020 | Fujimoto | |
| 2020/0168008 A1* | 5/2020 | Kuncl | G07C 5/008 |
| 2020/0379466 A1* | 12/2020 | Kitamura | G01C 21/3605 |
| 2021/0012600 A1* | 1/2021 | Imai | G07C 9/00896 |
| 2021/0192452 A1* | 6/2021 | Murray | G06Q 10/08355 |

FOREIGN PATENT DOCUMENTS

| | | |
|---|---|---|
| JP | 2018-156270 A | 10/2018 |
| WO | 2019/004475 A1 | 1/2019 |

\* cited by examiner

FIG. 2
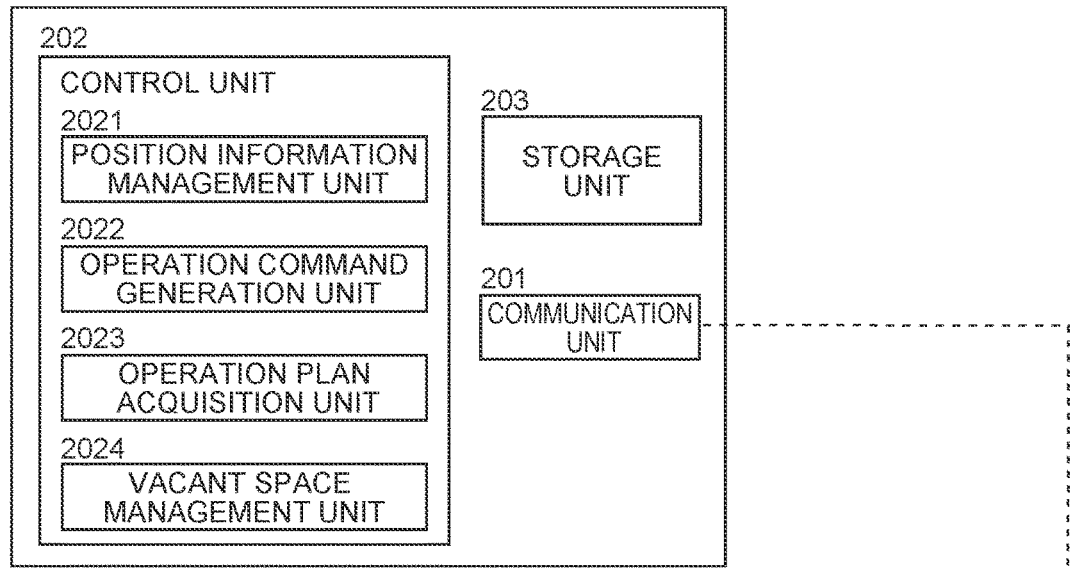
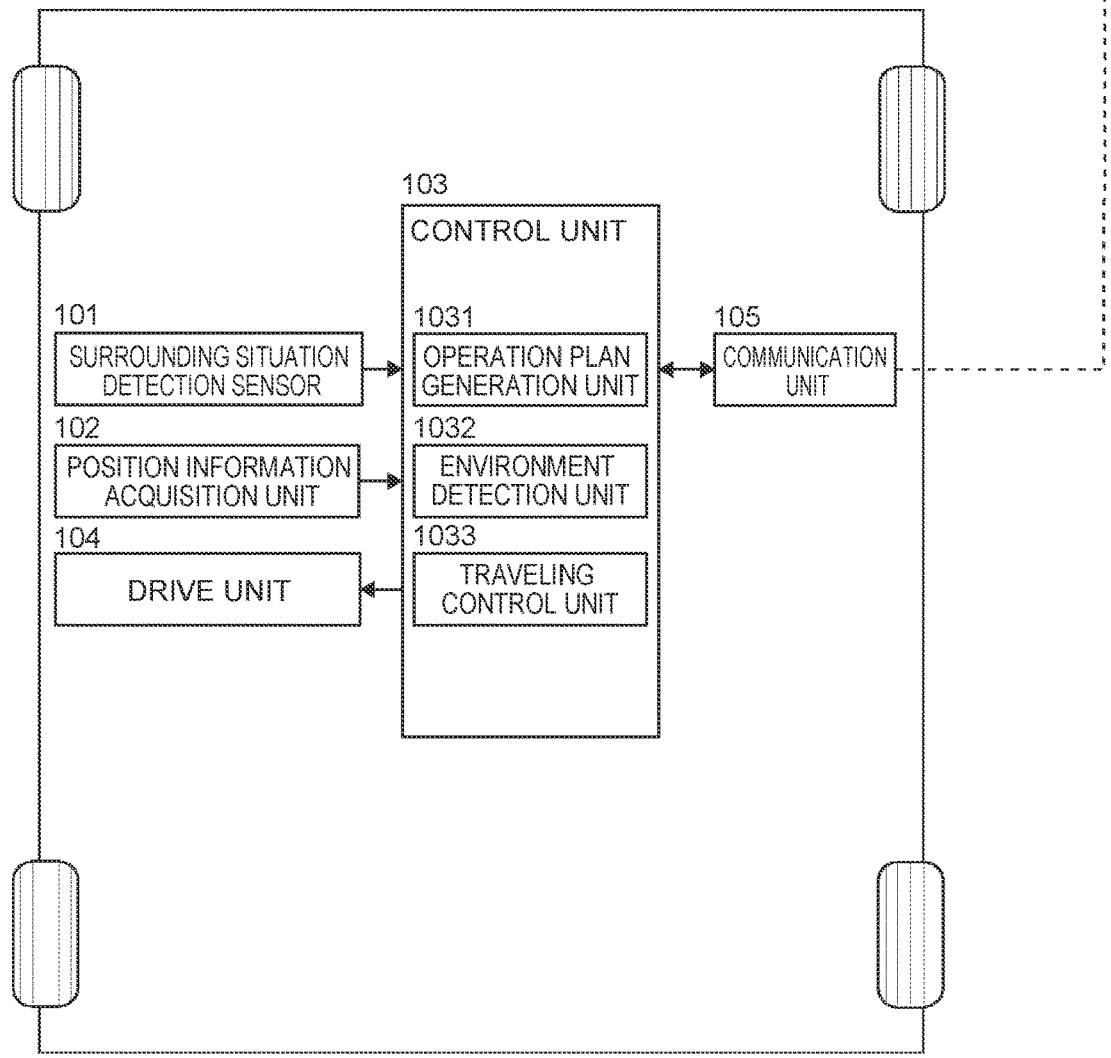

FIG. 4

| VEHICLE ID | TRAVELING ROUTE | START TIME | PARCEL ID | SIZE | DELIVERY DESTINATION | DELIVERY TIME | STATUS |
|---|---|---|---|---|---|---|---|
| S001 | ◇◇◇◇ | yy:yy | xxxx | ☐☐☐☐ | A | ○○○○ | CONVEYANCE COMPLETED |
| | | | xxxx | ☐☐☐☐ | B | ○○○○ | CONVEYING |

FIG. 5

| VEHICLE ID | TRAVELING SECTION | TIME | SIZE |
|---|---|---|---|
| S001 | L2 | xxxx | ☐☐☐☐ |
| | L3 | xxxx | ☐☐☐☐ |

| VEHICLE ID | TRAVELING SECTION | TIME | RIDING CAPACITY |
|---|---|---|---|
| S001 | △△△△ | xxxx | ☐☐☐☐ |
| S002 | △△△△ | xxxx | ☐☐☐☐ |
| ⋮ | | | |
| S00n | △△△△ | xxxx | ☐☐☐☐ |

_US 11,643,114 B2_

INFORMATION PROCESSING DEVICE, INFORMATION PROCESSING METHOD AND INFORMATION PROCESSING PROGRAM

INCORPORATION BY REFERENCE

The disclosure of Japanese Patent Application No. 2019-048580 filed on Mar. 15, 2019 including the specification, drawings and abstract is incorporated herein by reference in its entirety.

BACKGROUND

1. Technical Field

The disclosure relates to an information processing device, an information processing method and an information processing program.

2. Description of Related Art

In recent years, there has been developed a technology for transporting a parcel, a user and the like by a vehicle such as an autonomous automobile and an autonomous train. For example, Japanese Patent No. 6164599 proposes a technology in which a vehicle having a parcel loaded moves to a home delivery box at a delivery destination by autonomous traveling and the parcel loaded in the vehicle is put in the home delivery box.

SUMMARY

Here, during the transportation of the parcel by the vehicle, a vacant space is sometimes generated in a load space of the vehicle. In the case where the vacant space is generated in the load space, it is conceivable to increase transportation efficiency of the vehicle, by an effective utilization of the vacant space.

The disclosure has been made in view of the above circumstance, and an object of the disclosure is to provide a useful technology for utilizing the vacant space in the autonomous vehicle that delivers the parcel.

The disclosure is an information processing device that manages an operation of an autonomous vehicle having a loading space in which a parcel is loaded. The information processing device includes a control unit that executes: acquiring operation plan information including a route along which the autonomous vehicle travels when the autonomous vehicle delivers the parcel, and a delivery time for the parcel; and acquiring vacant space information based on the operation plan information, the vacant space information including a traveling section where a vacant space is generated in the loading space of the autonomous vehicle, a time when the vacant space is generated in the loading space of the autonomous vehicle, and the size of the vacant space that is generated in the loading space of the autonomous vehicle.

The disclosure can be regarded as an information processing method for managing an operation of an autonomous vehicle having a loading space in which a parcel is loaded. In that case, the information processing method according to the disclosure may cause a computer to execute: a step of acquiring operation plan information including a route along which the autonomous vehicle travels when the autonomous vehicle delivers the parcel, and a delivery time for the parcel; and a step of acquiring vacant space information based on the operation plan information, the vacant space information including a traveling section where a vacant space is generated in the loading space of the autonomous vehicle, a time when the vacant space is generated in the loading space of the autonomous vehicle, and the size of the vacant space that is generated in the loading space of the autonomous vehicle.

The disclosure can be regarded as an information processing program for managing an operation of an autonomous vehicle having a loading space in which a parcel is loaded, or as a non-transitory storage medium in which the information processing program is stored. In that case, the information processing program may cause a computer to execute: a step of acquiring operation plan information including a route along which the autonomous vehicle travels when the autonomous vehicle delivers the parcel, and a delivery time for the parcel; and a step of acquiring vacant space information based on the operation plan information, the vacant space information including a traveling section where a vacant space is generated in the loading space of the autonomous vehicle, a time when the vacant space is generated in the loading space of the autonomous vehicle, and the size of the vacant space that is generated in the loading space of the autonomous vehicle.

With the disclosure, it is possible to provide a useful technology for utilizing the vacant space in the autonomous vehicle that delivers the parcel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram schematically showing examples of configurations of the autonomous vehicle and a server device;

FIG. 4 is a diagram showing a configuration example of an operation plan information table;

FIG. 5 is a diagram showing a configuration example of a vacant space information table;

DETAILED DESCRIPTION OF EMBODIMENTS

Figure 1:
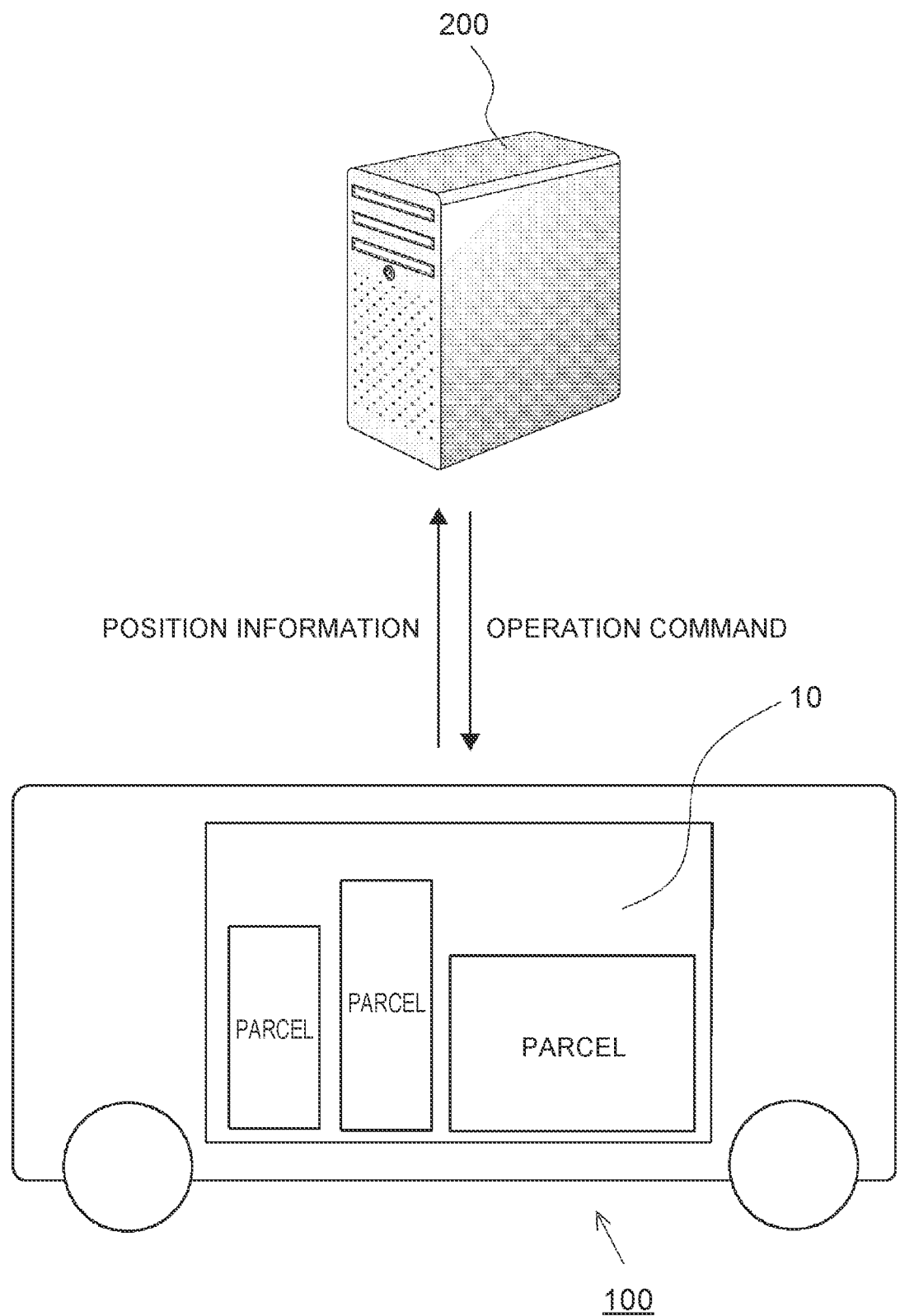
FIG. 1 is a diagram showing a schematic configuration of a system that provides a transportation service using an autonomous vehicle.

The disclosure is an information processing device that manages an operation of an autonomous vehicle. The autonomous vehicle is a vehicle that can autonomously travel on a road, and has a loading space in which a parcel is loaded. When the parcel is delivered by the autonomous vehicle, it is not necessary for a driver to ride in the vehicle. Therefore, it is possible to decrease transportation cost for the parcel.

In some cases, for example, in the case where the number of parcels loaded in the loading space of the autonomous vehicle is small or in the case where the volume of the parcels is small, a vacant space is generated in the loading space of the autonomous vehicle. In that case, it is conceivable to increase transportation efficiency by an effective utilization of the vacant space for transportation of an object other than the parcel that is a delivery object. For utilizing the vacant space of the loading space, it is important to know a traveling section where the vacant space is generated in the loading space of the autonomous vehicle, a time when the vacant space is generated in the loading space of the autonomous vehicle, the size of the vacant space that is generated in the loading space of the autonomous vehicle, and the like.

Hence, in the information processing device according to the disclosure, the control unit acquires operation plan information including a route (traveling route) along which the autonomous vehicle travels when the autonomous vehicle delivers the parcel, and a delivery time for the parcel. For example, the "traveling route" herein is an aggregation of a route along which the autonomous vehicle is scheduled to travel from a place (delivery start place) such as a delivery center to a delivery destination of the parcel and a route along which the autonomous vehicle returns from the delivery destination of the parcel to a delivery end place such as the delivery center and a vehicle storage place. The delivery start place is a place where loading of the parcel into the autonomous vehicle is performed. In the case where the autonomous vehicle delivers a plurality of parcels, the above traveling route is a route along which the autonomous vehicle is scheduled to travel so as to go from the delivery start place to delivery destinations of the parcels in sequence and return to the delivery end place. Further, the "delivery time" herein is a time when the parcel is brought to the delivery destination (a time when the autonomous vehicle arrives at the delivery destination).

By referring to the above operation plan information, it is possible to know a route along which the autonomous vehicle travels after the parcel is unloaded at the delivery destination, a time when the autonomous vehicle travels along the route, and the like. Further, it is possible to know the number, sizes and others of parcels that are unloaded from the loading space at the delivery destination of the autonomous vehicle, when the parcels are loaded in the loading space of the autonomous vehicle. Therefore, it is also possible to know the size of the vacant space that is generated in the loading space of the autonomous vehicle after the parcels are unloaded at the delivery destination. Consequently, the control unit can acquire vacant space information about the autonomous vehicle, based on the operation plan information. Thereby, the information processing device can know the traveling section where the vacant space is generated in the loading space of the autonomous vehicle, the time when the vacant space is generated in the loading space of the autonomous vehicle, and the size of the vacant space that is generated in the loading space of the autonomous vehicle. As a result, when a thing or human corresponding to the size of the vacant space that is generated in the loading space of the autonomous vehicle is loaded in the vacant space, it is possible to effectively utilize the vacant space of the loading space.

Here, as a method for utilizing the vacant space that is generated in the loading space of the autonomous vehicle, for example, there can be a method in which a human (user) rides in the vacant space. Particularly, in the case where a plurality of autonomous vehicles is managed by the information processing device, if vacant spaces of the autonomous vehicles can be utilized for user transportation, it is possible to realize a user transportation service appropriate to various user needs. Hence, in the case where a plurality of autonomous vehicles is managed by the information processing device, the control unit may accept a riding request including a riding section and a riding time that are desired by the user. Then, the control unit may extract an autonomous vehicle in which a vacant space having a size allowing the user to ride in the autonomous vehicle is generated in the loading space on the riding section at the riding time, based on the vacant space information about the autonomous vehicles. After the extraction of the autonomous vehicle, the control unit may send a command to cause the user to ride in the extracted autonomous vehicle on the riding section at the riding time, to the extracted autonomous vehicle. Thereby, the autonomous vehicle receives the command from the control unit, so that the autonomous vehicle can transport the user on the riding section desired by the user at the riding time desired by the user, using the vacant space of the loading space.

Even in the case where a plurality of autonomous vehicles is managed by the information processing device, there is a possibility that the control unit fails to extract the autonomous vehicle in which the vacant space having the size allowing the user to ride in the autonomous vehicle is generated in the loading space on the riding section desired by the user at the riding time desired by the user. For example, there can be a case where the autonomous vehicle in which the vacant space having the size allowing the user to ride in the autonomous vehicle is generated in the loading space on the riding section desired by the user at the riding time desired by the user is not operating. In that case, the control unit may extract an autonomous vehicle that travels in a predetermined range from the riding section at the riding time and in which the vacant space having the size allowing the user to ride in the autonomous vehicle is generated in the loading space, based on the vacant space information about the autonomous vehicles. Then, the control unit may send a command to alter a traveling route at the riding time to a route including the riding section and to cause the user to ride in the extracted autonomous vehicle on the riding section at the riding time, to the extracted autonomous vehicle. Thereby, the autonomous vehicle receives the command from the control unit, so that the autonomous vehicle can alter the traveling route at the riding time from the initial traveling route to the route including the riding section. Then, the autonomous vehicle can transport the user on the riding section desired by the user at the riding time desired by the user, using the vacant space of the loading space. As a result, it is possible to more surely realize the user transportation service appropriate to various user needs. The "predetermined range" herein is a range that is set such that the parcel delivery operation or the like is not obstructed even when the traveling route of the autonomous vehicle is altered from the initial traveling route to the traveling route including the riding section.

Further, in the case where the above user transportation service is realized, the control unit may generate user collecting information including traveling sections where vacant spaces are generated in loading spaces of the autonomous vehicles, times when the vacant spaces are generated in the loading spaces of the autonomous vehicles, and numbers (headcounts) of users that are able to ride in the vacant spaces that are generated in the loading spaces of the autonomous vehicles, based on the vacant space information about the autonomous vehicles, and may publish the generated user collecting information on a website. Thereby, the user can know whether there is an autonomous vehicle that meets a condition desired by the user, by watching the user collecting information published on the website. If there is an autonomous vehicle that meets the condition desired by the user, the user may perform the riding request to the information processing device.

A specific embodiment of the disclosure will be described below, based on the drawings. Unless otherwise described, the technical scope of the disclosure is not limited to dimensions, materials, shapes, relative dispositions and others of constituent components described in the embodiment.

Embodiment

In the embodiment, an example in which the disclosure is applied to a transportation service in which the delivery of the parcel is performed using the autonomous vehicle will be described.

Overview of System

FIG. 1 is a diagram showing a schematic configuration of a system (also referred to as a "transportation system", hereinafter) that provides a transportation service using the autonomous vehicle. The system shown in FIG. 1 is configured to include an autonomous vehicle 100 that performs autonomous traveling in accordance with an operation command that is given, and a server device 200 that issues the operation command to the autonomous vehicle 100. In the example shown in FIG. 1, only one autonomous vehicle 100 is illustrated. However, it is assumed that a plurality of autonomous vehicles 100 is managed by the server device 200.

The autonomous vehicle 100 is a vehicle that can perform the autonomous traveling on a road. Examples of the autonomous vehicle 100 include a share-ride bus that transports the user along a predetermined route, an on-demand taxi that operates along a route corresponding to a demand from the user, a parcel delivery vehicle that delivers a parcel to a designated delivery destination, and a stay-type passenger transportation vehicle (for example, a vehicle provided with a hotel function, a work space or the like within a vehicle cabin) that operates along a route corresponding to a demand from the user. The autonomous vehicles 100 do not always need to be vehicles in which persons other than passengers do not ride. For example, a service staff that performs service for passengers, a security staff that performs safety securement for the autonomous vehicle 100, a pickup-delivery staff that performs loading and unloading of parcels, or the like may ride together. Further, the autonomous vehicle 100 does not always need to be a vehicle that can perform a fully autonomous traveling, and may be a vehicle in which a driving staff drives the vehicle or assists the driving depending on situation. In this example, the autonomous vehicle 100 to which the disclosure is applied is a vehicle (parcel delivery vehicle) that operates mainly for the purpose of the delivery of parcels to delivery destinations and that has a loading space 10 in which the parcels are loaded.

The server device 200 is a device that manages and controls the operation of the autonomous vehicle 100. For example, in the case where the autonomous vehicle 100 is a parcel delivery vehicle, the server device 200 acquires delivery destinations of parcels, and then sends an operation command indicating "traveling to a predetermined spot to convey a parcel", to the autonomous vehicle 100. Thereby, the autonomous vehicle 100 receives the operation command from the server device 200, so that the autonomous vehicle 100 can travel toward the delivery destination of the parcel. The operation command is not limited to an operation command in which the delivery destination of the parcel is designated. For example, the server device 200 may acquire a pickup destination of parcels, and then may send an operation command indicating "traveling to a predetermined spot to pick up a parcel", to the autonomous vehicle 100.

The server device 200 also has a function to manage and operate the vacant space that is generated in the loading space 10 of the autonomous vehicle 100. For example, the server device 200 manages information (vacant space information) including the traveling section where the vacant space is generated in the loading space 10 of the autonomous vehicle 100, the time when the vacant space is generated in the loading space 10 of the autonomous vehicle 100, the size of the vacant space that is generated in the loading space 10 of the autonomous vehicle 100, and the like. The server device 200 accepts a request (riding request) from a user that hopes to ride in the above vacant space, and sends a command to cause the user to ride in the vacant space of the loading space 10, to the autonomous vehicle 100.

System Configuration

Next, constituent elements of the autonomous vehicle 100 in the embodiment will be described in detail. FIG. 2 is a block diagram schematically showing examples of configurations of the autonomous vehicle 100 and the server device 200 shown in FIG. 1. In the example shown in FIG. 2, only one autonomous vehicle 100 is illustrated. It is assumed that the other autonomous vehicles under the management by the server device 200 have the same configuration as the autonomous vehicle 100.

As described above, the autonomous vehicle 100 is a vehicle that performs the autonomous traveling on the road in accordance with the operation command acquired from the server device 200. The autonomous vehicle 100 is configured to include a surrounding situation detection sensor 101, a position information acquisition unit 102, a control unit 103, a drive unit 104, a communication unit 105, and the like. The autonomous vehicle 100 in the embodiment is an electric vehicle that drives an electric motor as a prime mover. The prime mover of the autonomous vehicle 100 is not limited to an electric motor, and may be an internal combustion engine, or a hybrid mechanism including an internal combustion engine and an electric motor.

The surrounding situation detection sensor 101 is means for sensing an area surrounding the vehicle, and is typically configured to include a stereo camera, a laser scanner, a LIDAR, a radar and the like. Information acquired by the surrounding situation detection sensor 101 is transferred to the control unit 103.

The position information acquisition unit 102 is means for acquiring the current position of the autonomous vehicle 100, and is typically configured to include a GPS receiver and the like. The position information acquisition unit 102 acquires the current position of the autonomous vehicle 100 with a predetermined period, and transfers information relevant to the acquired current position, to the control unit 103. Therewith, the control unit 103 sends the position information to the server device 200, whenever the control unit 103 receives the position information from the position information acquisition unit 102. That is, the position information about the autonomous vehicle 100 is sent from the autonomous vehicle 100 to the server device 200, with the predetermined period. Thereby, the server device 200 can know the current position about each autonomous vehicle 100.

The drive unit 104 is means for causing the autonomous vehicle 100 to travel based on a command generated by a traveling control unit 1033. For example, the drive unit 104 is configured to include a prime mover (an internal combustion engine, an electric motor, a hybrid mechanism including an internal combustion engine and an electric motor, or the like), a braking device, a steering device, and the like.

The communication unit 105 is communication means for connecting the autonomous vehicle 100 with a network. In the embodiment, the autonomous vehicle 100 can communicate with another device (for example, the server device 200) via the network, using a mobile communication service with 3rd generation (3G), long term evolution (LTE) or the like. The communication unit 105 may further include communication means for performing inter-vehicle communication with another autonomous vehicle 100. For example, the communication unit 105 sends the information about the current position of the autonomous vehicle 100 that is acquired by the position information acquisition unit 102, an operation plan that is generated by an operation plan generation unit 1031 described later, and the like, to the server device 200. Whenever the delivery of an individual parcel is completed, the communication unit 105 sends delivery completion information about the parcel, to the server device 200.

The control unit 103 is a computer that controls the operation of the autonomous vehicle 100 based on the information acquired from the surrounding situation detection sensor 101 and controls a traveling state of the autonomous vehicle 100 in accordance with the operation command from the server device 200. For example, the control unit 103 is constituted by a microcomputer. The control unit 103 in the embodiment includes the operation plan generation unit 1031, an environment detection unit 1032, and the traveling control unit 1033, as functional modules. Each functional module may be realized when an unillustrated central processing unit (CPU) executes a program stored in unillustrated storage means such as a read only memory (ROM).

The operation plan generation unit 1031 acquires the operation command from the server device 200, and generates an operation plan for the autonomous vehicle 100. In the embodiment, the operation plan includes a route (traveling route) along which the autonomous vehicle 100 is scheduled to travel, data prescribing a process that should be performed on a part or a whole of the traveling route by the autonomous vehicle 100, data indicating a scheduled time when the autonomous vehicle 100 departs from or arrives at an arbitrary spot on the traveling route, and the like. Examples of the data included in the operation plan are shown as follows.

(1) Data Indicating Traveling Route of Autonomous Vehicle 100 as Aggregation of Road Links For example, the "traveling route" herein may be generated by the operation plan generation unit 1031, based on the delivery start place and the delivery destination that are given in the operation command from the server device 200, while the operation plan generation unit 1031 refers to map data that is stored in a storage device mounted on the autonomous vehicle 100. Further, the "traveling route" may be generated using an external service, or may be provided from the server device 200. The "traveling route" generated using the operation plan generation unit 1031 of the autonomous vehicle 100 or the external service is sent to the server device 200 through the communication unit 105 described later.

(2) Data Indicating Process That Should Be Performed at Arbitrary Spot on Traveling Route by Autonomous Vehicle 100

Examples of the "arbitrary spot" herein include a delivery start place such as a delivery center, a delivery destination of the parcel, a pickup place of the parcel, a getting-in place for the user, and a getting-out place for the user. The process that should be performed at the above arbitrary spot by the autonomous vehicle 100 includes "loading the parcel", "unloading the parcel", "causing the user to get in the autonomous vehicle", and "causing the user to get out of the autonomous vehicle", for example, but is not limited to them.

(3) Data Indicating Scheduled Time when Autonomous Vehicle 100 Departs from or Arrives at Arbitrary Spot on Traveling Route The scheduled time when the autonomous vehicle 100 departs from or arrives at an arbitrary spot on the traveling route includes a "scheduled time of the departure from the delivery start place", a "scheduled time (delivery time) of the arrival at the delivery destination", a "scheduled time of the arrival at the pickup destination", a "scheduled time of the arrival at the getting-in place for the user", and a "scheduled time of the arrival at the getting-out place for the user", but is not limited to them.

The information (operation plan information) indicating the operation plan generated by the operation plan generation unit 1031 is sent to the server device 200 through the communication unit 105. That is, when the operation plan for the autonomous vehicle 100 is generated, the operation plan information is sent to the server device 200 by the communication unit 105. Thereby, the server device 200 can know the operation plan for each autonomous vehicle 100.

The environment detection unit 1032 detects an environment surrounding the vehicle, based on the data acquired by the surrounding situation detection sensor 101. Objects of the detection include the number and positions of lanes, the number and positions of vehicles existing in the area surrounding the autonomous vehicle 100, the number and positions of obstacles (for example, pedestrians, bicycles, structures and buildings) existing in the area surrounding the autonomous vehicle 100, the structure of the road, and traffic signs, for example, but is not limited to them. Any object may be detected if the object is necessary for the autonomous traveling. Further, the environment detection unit 1032 may perform tracking of a detected physical object. For example, the environment detection unit 1032 may obtain the relative speed of the physical object from the difference between the coordinates of the physical object detected at the last step and the current coordinates of the physical object.

The traveling control unit 1033 controls the traveling of the autonomous vehicle 100, based on the operation plan generated by the operation plan generation unit 1031, the environment data generated by the environment detection unit 1032, and the position information about the autonomous vehicle acquired by the position information acquisition unit 102. For example, the traveling control unit 1033 causes the autonomous vehicle to travel along the traveling route generated by the operation plan generation unit 1031, and causes the autonomous vehicle to travel such that no obstacle enters a predetermined safety region around the autonomous vehicle. As a method for the autonomous traveling of the vehicle, a known method can be employed. Further, the traveling control unit 1033 also has a function to control the traveling of the autonomous vehicle 100 in accordance with a command from the server device 200.

Next, the server device 200 will be described. The server device 200 is a device that manages the traveling position of the autonomous vehicle 100 under the management of the server device 200 and that sends the operation command. Further, the server device 200 also has a function to manage and operate the vacant space information about each autonomous vehicle 100. The server device 200 is configured to include a communication unit 201, a control unit 202 and a storage unit 203. The communication unit 201 is a communication interface for performing communication with the autonomous vehicle 100 via the network, similarly to the communication unit 105.

The control unit 202 is means for controlling the server device 200. For example, the control unit 202 is constituted by a CPU. The control unit 202 in the embodiment includes a position information management unit 2021, an operation command generation unit 2022, an operation plan acquisition unit 2023, and a vacant space management unit 2024, as functional modules. Each of the functional modules may be realized when an unillustrated CPU executes a program stored in unillustrated storage means such as a ROM.

The position information management unit 2021 manages the positions of a plurality of autonomous vehicles 100 under the management of the server device 200. Specifically, the position information management unit 2021 receives the position information that is sent from the plurality of autonomous vehicles 100 with the predetermined period, and stores the received position information in the storage unit 203 described later, in association with date and time.

When the operation command generation unit 2022 receives a dispatch request for the autonomous vehicle 100 from the exterior, the operation command generation unit 2022 decides an autonomous vehicle 100 to be dispatched, and generates an operation command corresponding to the dispatch request. The dispatch request is the following request, for example, but may be another request.

(1) Parcel Delivery Request

A parcel delivery request is a request for performing the delivery of the parcel by designating a departure place (delivery start place), a destination place (delivery destination or pickup destination), the time (delivery time or pickup time) of the arrival at the destination place, and the like.

(2) User Transportation Request (Riding Request)

A user transportation request is a request for performing the transportation of the user by designating the riding section, the riding time and the like. The "transportation of the user" in the embodiment is performed using the vacant space that is generated in the loading space 10 of the autonomous vehicle 100.

For example, the above dispatch request is acquired from a using person through the internet or telephone. Examples of the source of the dispatch request include a business operator that operates the autonomous vehicle 100, a delivery operator that gets a contract to deliver the parcel, and the user that hopes to ride in the autonomous vehicle 100. The autonomous vehicle 100 that is the destination of the operation command is decided depending on the position information about each autonomous vehicle 100 acquired by the position information management unit 2021 and a specification of each autonomous vehicle 100 previously known by the server device 200 (use purposes of internal and external apparatuses included in the autonomous vehicle 100). After the autonomous vehicle 100 that is the destination of the operation command is decided, the operation command generated by the operation command generation unit 2022 is sent to the autonomous vehicle 100 by the communication unit 201.

The operation plan acquisition unit 2023 acquires the operation plan information about each autonomous vehicle 100. Specifically, the operation plan acquisition unit 2023 receives the operation plan information sent from the communication unit 105 of the autonomous vehicle 100 at the timing when the operation plan is generated in the autonomous vehicle 100, through the communication unit 201 of the server device 200, and thereby acquires the operation plan information about the autonomous vehicle 100. The operation plan information acquired by the operation plan acquisition unit 2023 is stored in the storage unit 203 described later, together with information relevant to the parcel that is delivered by the autonomous vehicle 100.

The vacant space management unit 2024 manages the vacant space that is generated in the loading space 10 of each autonomous vehicle 100. Specifically, based on the operation plan information about each autonomous vehicle 100, the vacant space management unit 2024 acquires the vacant space information including the traveling section where the vacant space is generated in the loading space 10 of the autonomous vehicle 100, the time when the vacant space is generated in the loading space 10 of the autonomous vehicle 100, and the size of the vacant space that is generated in the loading space 10 of the autonomous vehicle 100. The vacant space information acquired by the vacant space management unit 2024 is stored in the storage unit 203 described later. The traveling section where the vacant space is generated in the loading space 10 of the autonomous vehicle 100 is a section that is of the traveling route of the autonomous vehicle 100 and where the autonomous vehicle 100 travels after the parcel is unloaded at the delivery destination, and can be obtained from the traveling route and the position information about the delivery destination. The time when the vacant space is generated in the loading space 10 of the autonomous vehicle 100 is a time when the autonomous vehicle 100 travels on the above traveling section, and can be obtained from the delivery time for the parcel. The size of the vacant space that is generated in the loading space 10 of the autonomous vehicle 100 can be obtained from the size of a parcel that is unloaded at the delivery destination. The number and sizes of parcels that are loaded in the autonomous vehicle 100 may be stored in the storage unit 203 or the like, when the parcels are loaded in the autonomous vehicle 100.

Figure 3:
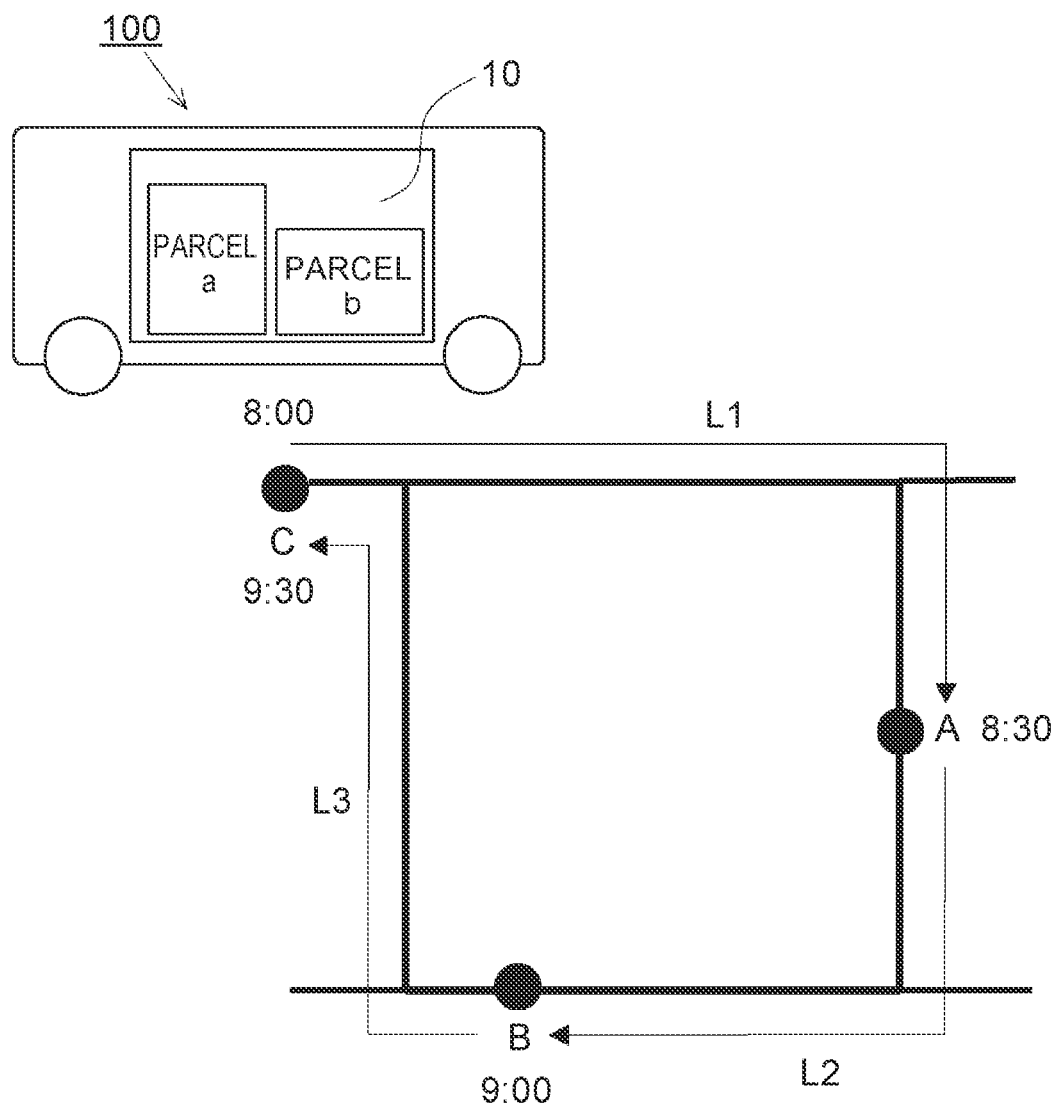
FIG. 3 is a diagram schematically showing an operation plan for an autonomous vehicle that delivers parcels a, b.

An example of a procedure for acquiring the vacant space information will be described based on FIG. 3. FIG. 3 is a diagram schematically showing an operation plan for the autonomous vehicle 100 that delivers two parcels a, b. In the operation plan shown in FIG. 3, first, the autonomous vehicle 100, in which the parcels a, b have been loaded at a delivery center C, moves to a first spot A that is the delivery destination of the parcel a, and the parcel a is unloaded from the autonomous vehicle 100. Next, the autonomous vehicle 100 moves from the first spot A to a second spot B that is the delivery destination of the parcel b, and the parcel b is unloaded from the autonomous vehicle 100. Thereafter, the autonomous vehicle 100 returns from the second spot B to the delivery center C. That is, in the operation plan shown in FIG. 3, the traveling route of the autonomous vehicle 100 is an aggregation of a road link L1 connecting the delivery center C and the first sport A, a road link L2 connecting the first spot A and the second spot B, and a road link L3 connecting the second spot B and the delivery center C. In the example shown in FIG. 3, a delivery start time (a scheduled time of the departure from the delivery center C) is 8:00, a delivery time (a scheduled time of the arrival at the first spot A) for the parcel a is 8:30, a delivery time (a scheduled time of the arrival at the second spot B) for the parcel b is 9:00, and a delivery end time (a scheduled time of the return to the delivery center C) is 9:30. The delivery start time is a time that is decided depending on the delivery time for the parcel a, the distance from the delivery center C to the first spot A, congestion information about the road link L1 connecting the delivery center C and the first spot A, and the like, and is set such that the autonomous vehicle 100 can arrive at the first spot A by the delivery time (8:30) for the parcel a. The delivery end time is a time that is predicted based on the delivery time (9:00) for the parcel b, the distance from the second spot B to the delivery center C, congestion information about the road link L3 connecting the second spot B and the delivery center C, and the like. In the example shown in FIG. 3, it is assumed that the loading space 10 has no vacant space having a size allowing the user to ride, in the state where the parcels a, b are loaded.

In the operation plan shown in FIG. 3, on the traveling section L2 of the traveling sections L1 to L3 of the autonomous vehicle 100, a vacant space corresponding to the size of the parcel a that is unloaded from the autonomous vehicle 100 at the first spot A is generated in the loading space 10. A scheduled time when the autonomous vehicle 100 travels on the traveling section L2 is a time period of 8:30 to 9:00. Further, on the traveling section L3 of the traveling sections L1 to L3, a vacant space corresponding to the size of the parcel b that is unloaded from the autonomous vehicle 100 at the second spot B is generated in the loading space 10, in addition to the vacant space corresponding to the size of the parcel a that is unloaded from the autonomous vehicle 100 at the first spot A. That is, on the traveling section L3, a vacant space having a size resulting from summing the size of the parcel a and the size of the parcel b is generated in the loading space 10. A scheduled time when the autonomous vehicle 100 travels on the traveling section L3 is a time period of 9:00 to 9:30. Consequently, from the operation plan in FIG. 3, it is possible to acquire vacant space information indicating that the vacant space corresponding to the size of the parcel a is generated on the traveling section L2 at the time period of 8:30 to 9:00, and further, it is possible to acquire vacant space information indicating that the vacant space having the size resulting from summing the sizes of the parcels a, b is generated on the traveling section L3 at the time period of 9:00 to 9:30.

When the server device 200 receives the user transportation request (riding request) as the above-described dispatch request, the vacant space management unit 2024 performs a process of extracting an autonomous vehicle 100 that meets the riding request. As described above, the "riding request" herein includes the information designating the riding section (the getting-in place and the getting-out place) and the riding time (the time when the user gets in the autonomous vehicle 100 at the getting-in place, the time when the user gets out of the autonomous vehicle 100 at the getting-out place, and the like) that are desired by the user. Hence, the vacant space management unit 2024 refers to the vacant space information about the autonomous vehicles 100, and extracts an autonomous vehicle 100 that is scheduled to travel on a traveling section including the above riding section at a time period including the above riding time and in which a vacant space having a size allowing the user to ride in the autonomous vehicle 100 is generated in the loading space 10 on the traveling section. For example, in the above-described example shown in FIG. 3, the vacant space is generated in the loading space 10 of the autonomous vehicle 100, on a section (the traveling section L2 and the traveling section L3) from the first spot A to the delivery center C. Therefore, in the case where the riding section desired by the user is included in the traveling sections L2, L3, where the riding time for the user is included in the time period (8:30 to 9:30) when the autonomous vehicle 100 travels on the traveling sections L2, L3, and where the size of the vacant space to be generated in the loading space 10 on the traveling sections L2, L3 is a size allowing the user to ride in the autonomous vehicle 100, the autonomous vehicle 100 illustrated in FIG. 3 is extracted as the vehicle that meets the riding request.

When the vacant space management unit 2024 extracts the autonomous vehicle 100 that meets the riding request from the user, the operation command generation unit 2022 generates an operation command (also referred to as a "user transportation command", hereinafter) to cause the user to ride in the autonomous vehicle 100 on the above riding section at the above riding time, and sends the generated user transportation command to the autonomous vehicle 100, as described above. Thereby, the autonomous vehicle 100 receives the above user transportation command, so that the autonomous vehicle 100 can transport the user using the vacant space that is generated in the loading space 10 of the autonomous vehicle 100.

The storage unit 203 is means for storing information, and is constituted by a storage medium such as a RAM, a magnetic disc or a flash memory. In the storage unit 203 in the embodiment, the operation plan information acquired by the above-described operation plan acquisition unit 2023 is stored, such that the operation plan information is associated with identification information about the individual autonomous vehicle 100. Here, a configuration example of the operation plan information stored in the storage unit 203 will be described based on FIG. 4. FIG. 4 is a diagram showing a table configuration of the operation plan information. Information to be registered in an operation plan information table is not limited to the example shown in FIG. 4, and addition, alteration or deletion of a field can be performed when appropriate. The operation plan information table shown in FIG. 4 has fields of vehicle ID, traveling route, start time, parcel ID, size, delivery destination, delivery time and status. In the vehicle ID field, vehicle identification information for identifying the individual autonomous vehicle 100 is input. In the traveling route field, information indicating the traveling route set by the operation plan for the autonomous vehicle 100 is input. In the start time field, the delivery start time (the time when the autonomous vehicle 100 departs from the delivery start place) set by the operation plan for the autonomous vehicle 100 is input. In the parcel ID field, parcel identification information for identifying the parcel that is delivered by the autonomous vehicle 100 is input. In the size field, information indicating the size of the parcel is input. In the delivery destination field, information indicating the delivery destination of the parcel is input. The information to be input in the delivery destination field may be information indicating the address of the place of the delivery destination, or may be information indicating the coordinates (latitude, longitude) of the place of the delivery destination on a map. In the delivery time field, the scheduled time when the autonomous vehicle 100 arrives at the delivery destination of the parcel is input.

In the status field, information indicating whether the conveyance of the parcel has been completed is input. For example, in the case where the conveyance of the parcel has not been completed, "conveying" is input, and in the case where the conveyance of the parcel has been completed, "conveyance completed" is input. In the example shown in FIG. 4, two pieces of parcel-relevant information are associated with one piece of vehicle identification information. This shows that two parcels are delivered by one autonomous vehicle 100. The number of pieces of parcel-relevant information to be associated with one piece of vehicle identification information may be one, or may be three or more. In short, the parcel information corresponding to the number of parcels that are delivered by the autonomous vehicle 100 may be associated with the vehicle identification information about the autonomous vehicle 100. In the example shown in FIG. 4, the delivery destinations of the two parcels are different from each other, but the delivery destinations of the two parcels may be the same.

In the storage unit 203, in addition to the above operation plan information about the autonomous vehicle 100, the vacant space information acquired by the above-described vacant space management unit 2024 is stored, such that the vacant space information is associated with the identification information about the individual autonomous vehicle 100. Here, a configuration example of the vacant space information stored in the storage unit 203 will be described based on FIG. 5. FIG. 5 is a diagram showing a table configuration of the vacant space information. Information to be registered in a vacant space information table is not limited to the example shown in FIG. 5, and addition, alteration or deletion of a field can be performed when appropriate. The vacant space information table shown in FIG. 5 has fields of vehicle ID, traveling section, time and size. In the vehicle ID field, vehicle identification information for identifying the individual autonomous vehicle 100 is input. The vehicle identification information to be input in the vehicle ID field of the vacant space information table is the same as the information to be input in the vehicle ID field of the operation plan information table shown in FIG. 4. In the traveling section field, information indicating the traveling section where the vacant space is generated in the loading space 10 of the autonomous vehicle 100 is input. In the case where the vacant space corresponding to the size of the parcel a is generated in the loading space 10 on the traveling section L2 of the traveling sections L1 to L3 as illustrated in FIG. 3, information indicating the traveling section L2 is input in the traveling section field. Further, in the example illustrated in FIG. 3, the vacant space having the size resulting from summing the sizes of the parcels a, b is generated in the loading space 10 on the traveling section L3 of the traveling sections L1 to L3, and therefore, in addition to the traveling section field in which the information indicating the traveling section L2 is input, a traveling section field in which information indicating the traveling section L3 is input is registered in the vacant space information table for the autonomous vehicle 100. Next, in the time field, information indicating the time when the vacant space is generated in the loading space 10 of the autonomous vehicle 100 is input. In other words, information indicating the time when the autonomous vehicle 100 is scheduled to travel on the traveling section where the vacant space is generated in the loading space 10 is input. Here, as illustrated in FIG. 3, in the case where the vacant space is generated in the loading space 10 of the autonomous vehicle 100 on the traveling section L2, the scheduled time of the traveling on the traveling section L2 is the time period of 8:30 to 9:00, and therefore information indicating the time period of 8:30 to 9:00 is input in the time field. Further, in the example shown in FIG. 3, the vacant space is generated in the loading space 10 of the autonomous vehicle 100 on the traveling section L3, and therefore the scheduled time (the time period of 9:00 to 9:30) when the autonomous vehicle 100 travels on the traveling section L3 is input in the time field corresponding to the traveling section L3. In the size field, information indicating the size of the vacant space that is generated in the loading space 10 of the autonomous vehicle 100 is input. In other words, information indicating the size of the vacant space that is generated in the loading space 10 is input for each traveling section of the autonomous vehicle 100. In the case where the vacant space corresponding to the size of the parcel a is generated in the loading space 10 on the traveling section L2 as illustrated in FIG. 3, information indicating the size of the parcel a is input in the size field. Further, in the case where the vacant space having the size resulting from summing the sizes of the parcels a, b is generated in the loading space 10 on the traveling section L3, information indicating the size resulting from summing the sizes of the parcels a, b is input in the size field corresponding to the traveling section L3. The information to be registered in the size field may be information indicating the physical size of the vacant space, or may be information indicating the number (headcount) of users that can ride in the vacant space. On that occasion, a correlation between the size of the vacant space and the number of users that can ride in the vacant space is previously obtained from a result of an experiment or simulation, or the like.

Operation Behavior of Autonomous Vehicle

Figure 6:
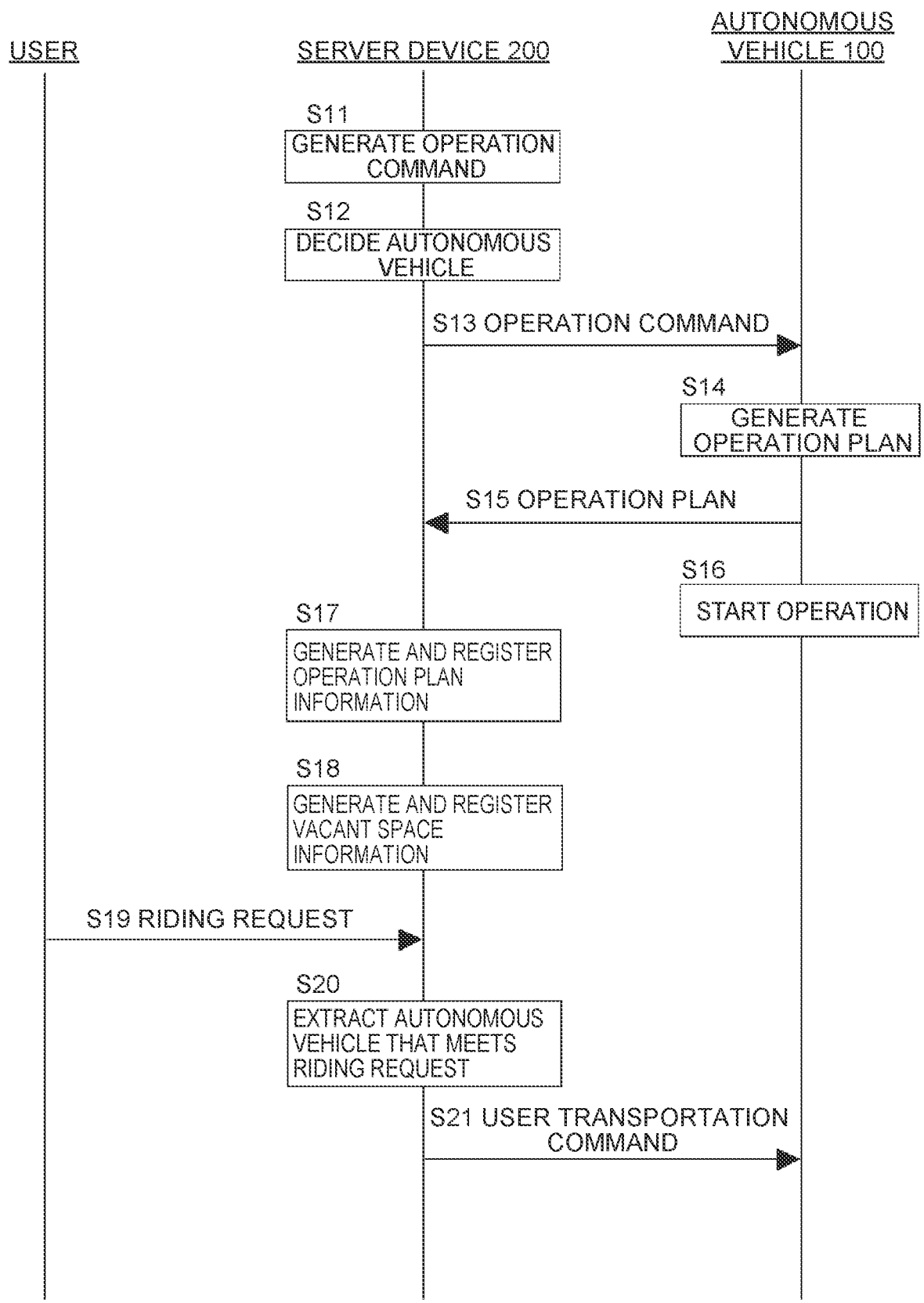
FIG. 6 is a flowchart showing an outline of a flow of data that is sent and received among constituent elements of a transportation system and a flow of processes that are performed by the constituent elements.

Here, processes that are performed by constituent elements of the transportation system will be described. FIG. 6 is a flowchart showing an outline of a flow of data that is sent and received among the constituent elements of the transportation system and a flow of processes that are performed by the constituent elements.

In FIG. 6, when the server device 200 accepts the "parcel delivery request" from a business operator that operates the autonomous vehicle 100 or a delivery operator that gets a contract to deliver the parcel, the operation command generation unit 2022 generates the operation command (step S11). As described above, the "parcel delivery request" herein includes information designating the departure place (the delivery start place), the destination place (the delivery destination of the parcel), the time (the delivery time) of the arrival at the destination place, and the like. Therewith, for example, the operation command generation unit 2022 generates the operation command including the position information about the delivery start place, the position information about the delivery destination, the time of the arrival at the delivery destination, and the like.

After the above operation command is generated, the operation command generation unit 2022 decides an autonomous vehicle 100 appropriate to the delivery request (step S12). Specifically, the operation command generation unit 2022 extracts all autonomous vehicles 100 that include equipment appropriate to the delivery of the parcel and that can operate in a period from the parcel delivery start to the parcel delivery completion. Subsequently, the operation command generation unit 2022 decides one autonomous vehicle 100 that can move to the delivery start place by the delivery start time, based on the position information about each of the extracted autonomous vehicles 100.

After the autonomous vehicle 100 appropriate to the delivery request is decided, the operation command generation unit 2022 sends the operation command generated in step S11, to the decided autonomous vehicle 100 (step S13).

The communication unit 105 of the autonomous vehicle 100 receives the operation command sent from the server device 200. Then, the operation plan generation unit 1031 of the autonomous vehicle 100 generates the operation plan based on the operation command received from the server device 200 (step S14). As described above, the operation plan generated by the operation plan generation unit 1031 includes the traveling route, the process that should be performed at an arbitrary spot on the traveling route by the autonomous vehicle 100 (for example, a process of loading the parcel at the delivery start place, or a process of unloading the parcel at the delivery destination), and the scheduled time of the departure from or arrival at an arbitrary spot on the traveling route (for example, the scheduled time of the departure from the delivery start place, or the scheduled time (delivery time) of the arrival at the delivery destination).

Information indicating the operation plan generated by the operation plan generation unit 1031 of the autonomous vehicle 100 is sent from the communication unit 105 of the autonomous vehicle 100 to the server device 200 (step S15). Further, the operation plan generated by the operation plan generation unit 1031 is transferred to the traveling control unit 1033. The traveling control unit 1033 starts the operation of the autonomous vehicle 100, in accordance with the operation plan received from the operation plan generation unit 1031 (step S16).

The operation plan information sent from the autonomous vehicle 100 to the server device 200 is transferred from the communication unit 201 of the server device 200 to the control unit 202. Thereby, the operation plan acquisition unit 2023 of the control unit 202 acquires the operation plan information about the autonomous vehicle 100. Then, the operation plan acquisition unit 2023 generates the operation plan information table, based on the operation plan information about the autonomous vehicle 100 and the information relevant to the parcel that is delivered by the autonomous vehicle 100, and registers the generated operation plan information table in the storage unit 203 (step S17). As described in FIG. 4, the operation plan information table generated by the operation plan acquisition unit 2023 includes the traveling route of the autonomous vehicle 100, the scheduled time when the autonomous vehicle 100 departs from the delivery start place, the identification information about the parcel that is delivered by the autonomous vehicle 100, the size of the parcel that is delivered by the autonomous vehicle 100, the delivery destination of the parcel that is delivered by the autonomous vehicle 100, the delivery time for the parcel that is delivered by the autonomous vehicle 100, and the status.

Subsequently, the vacant space management unit 2024 of the server device 200 generates the vacant space information table for the autonomous vehicle 100, by referring to the operation plan information table generated in step S17. Specifically, the vacant space management unit 2024 identifies the traveling section where the vacant space is generated in the loading space 10 of the autonomous vehicle 100, from the traveling route of the autonomous vehicle 100 and the position information about the delivery destination of the parcel. Further, the vacant space management unit 2024 obtains the time period when the autonomous vehicle 100 travels on the above traveling section (the time when the vacant space is generated in the loading space 10 of the autonomous vehicle 100), from the delivery time for the parcel. Furthermore, the vacant space management unit 2024 obtains the size of the vacant space that is generated in the loading space 10 of the autonomous vehicle 100 on the above traveling section, from the sizes, number and others of parcels that are unloaded from the autonomous vehicle 100 at the delivery destination. After the vacant space management unit 2024 obtains the traveling section where the vacant space is generated in the loading space 10 of the autonomous vehicle 100, the time when the autonomous vehicle 100 travels on the traveling section, and the size of the vacant space that is generated in the loading space 10 on the traveling section in this way, the vacant space management unit 2024 generates the vacant space information table shown in FIG. 5, and registers the generated vacant space information table in the storage unit 203 (step S18). Thereby, the server device 200 can know the traveling section where the vacant space is generated in the loading space 10 of the autonomous vehicle 100, the time when the vacant space is generated in the loading space 10 of the autonomous vehicle 100, and the size of the vacant space that is generated in the loading space 10 of the autonomous vehicle 100.

The server device 200 receives the dispatch request (riding request) from the user that hopes to ride in the autonomous vehicle 100 (step S19), and then the vacant space management unit 2024 of the server device 200 extracts the autonomous vehicle 100 that meets the riding request from the user (step S20). The process of step S20 is performed based on a processing flow shown in FIG. 7.

Figure 7:
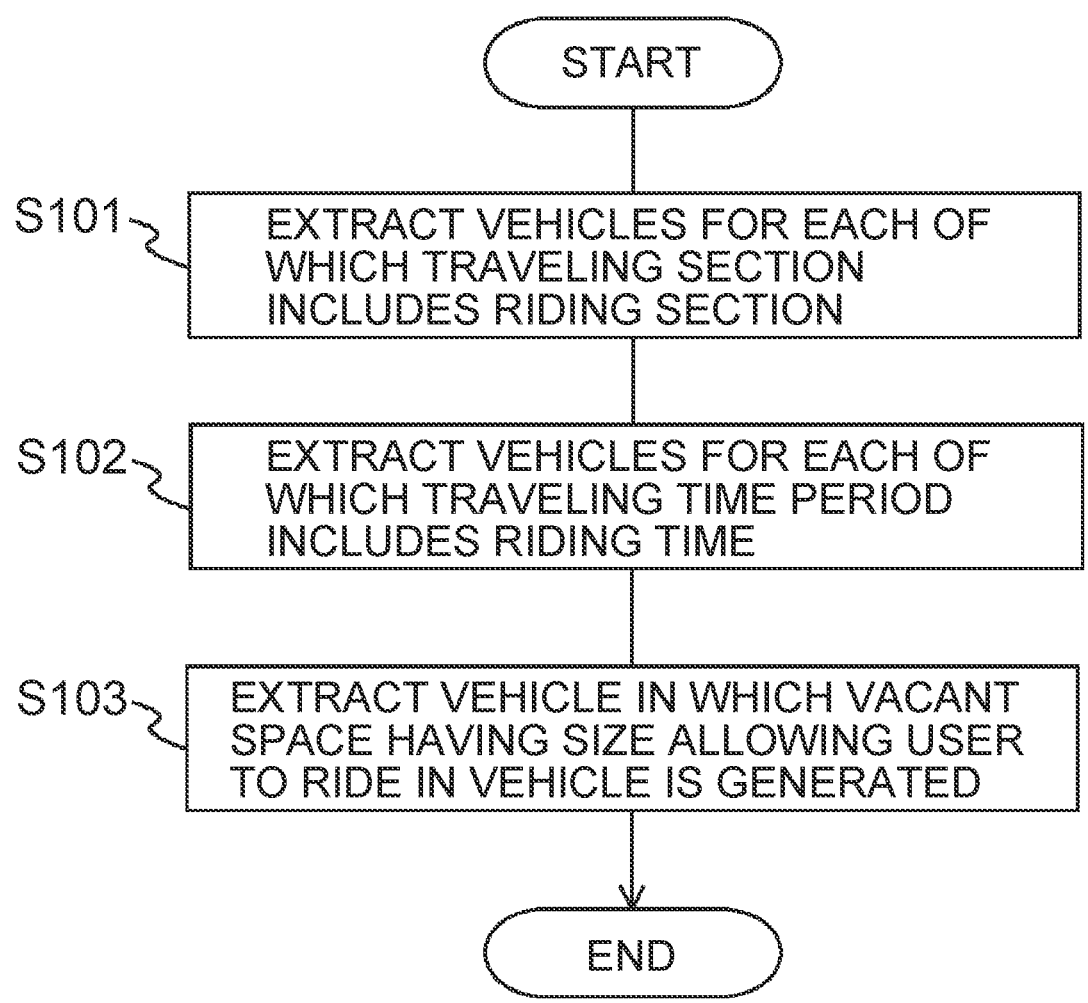
FIG. 7 is a flowchart showing a behavior of the server device when a riding request is received.

In FIG. 7, the vacant space management unit 2024 extracts autonomous vehicles 100 each of which is scheduled to travel on a traveling section including the riding section designated in the riding request (step S101). Specifically, by accessing the storage unit 203, the vacant space management unit 2024 extracts all vacant space information tables in each of which a traveling section including the above riding section is registered in a traveling section field.

The vacant space management unit 2024 extracts autonomous vehicles 100 each of which is scheduled to travel on the traveling section including the riding section at a time period including the riding time designated in the riding request, from the autonomous vehicles 100 extracted in step S101 (step S102). Specifically, the vacant space management unit 2024 extracts all vacant space information tables each of which a time period including the above riding time is registered in a time field corresponding to the traveling section including the above riding section, from the vacant space information tables extracted in step S101.

The vacant space management unit 2024 extracts an autonomous vehicle 100 in which a vacant space having a size allowing the user to ride in the autonomous vehicle 100 is generated in the loading space 10 on the traveling section including the above riding section at the time period including the riding time designated in the riding request, from the autonomous vehicles 100 extracted in step S102 (step S103). Specifically, the vacant space management unit 2024 extracts a vacant space information table in which a size allowing the user to ride in the autonomous vehicle 100 is registered in a size field corresponding to the traveling section including the above riding section, from the vacant space information tables extracted in step S102. Then, the vacant space management unit 2024 reads the vehicle identification information registered in the vehicle ID field of the extracted vacant space information table, and thereby identifies an autonomous vehicle 100 that meets the riding request from the user. In the case where a plurality of autonomous vehicles 100 is extracted in step S103, an autonomous vehicle 100 for which the time period of the traveling on the traveling section including the above riding section is closest to the above riding time may be selected, or an autonomous vehicle 100 for which the size of the vacant space that is generated in the loading space 10 on the traveling section including the above riding section is largest.

Back to FIG. 6, the operation command generation unit 2022 of the server device 200 sends the operation command (user transportation command) to cause the user to ride in the autonomous vehicle 100 on the riding section designated in the above riding request at the riding time designated in the above riding request, to the autonomous vehicle 100 extracted in step S20. Thereby, the autonomous vehicle 100 receives the user transportation command, so that the autonomous vehicle 100 can transport the user on the above riding section at the above riding time, using the vacant space that is generated in the loading space 10 of the autonomous vehicle 100.

With the above-described embodiment, in the case where the autonomous vehicle 100 is used as a parcel delivery vehicle, the server device 200 can know the traveling section where the vacant space is generated in the loading space 10 of the autonomous vehicle 100, the time when the vacant space is generated in the loading space 10 of the autonomous vehicle 100, and the size of the vacant space that is generated in the loading space 10 of the autonomous vehicle 100. Thereby, it is possible to transport the user using the vacant space that is generated in the loading space 10 of the autonomous vehicle 100. As a result, it is possible to increase the transportation efficiency, compared to the case of transporting the parcel and the user by separate vehicles. The method for utilizing the vacant space that is generated in the loading space 10 of the autonomous vehicle 100 is not limited to the method of causing the user to ride in the vacant space, and may be a method of loading a thing other than the parcel that is an initial delivery object, in the vacant space.

First Modification of Embodiment

In the above embodiment, the example of extracting the autonomous vehicle in which the vacant space having the size allowing the user to ride in the autonomous vehicle is generated in the loading space on the riding section designated in the riding request at the riding time designated in the riding request when the server device receives the riding request from the user has been described. However, there can be a case where the autonomous vehicle that meets the riding request from the user is not operating. In that case, the server device fails to extract the autonomous vehicle that meets the riding request from the user. Hence, in the modification, when the server device fails to extract the autonomous vehicle that meets the riding request from the user, the server device extracts an autonomous vehicle that travels in a predetermined range from the above riding section at the above riding time and in which the vacant space having the size allowing the user to ride in the autonomous vehicle is generated in the loading space. Then, the server device may send a command to alter the traveling route to a route including the above riding section and to cause the user to ride in the extracted autonomous vehicle on the above riding section at the above riding time, to the extracted autonomous vehicle.

Figures 8, 9:
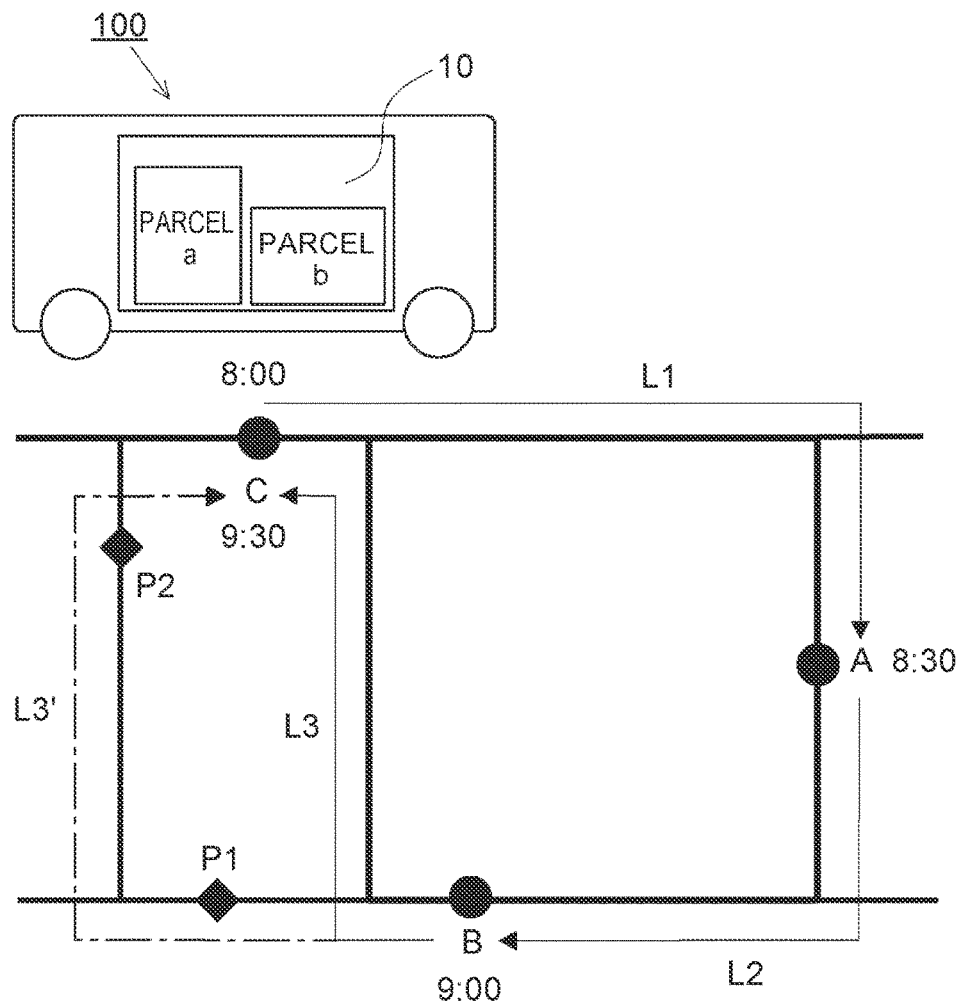
FIG. 8 is a diagram schematically showing a procedure for altering a traveling route of the autonomous vehicle to a route including a riding section for a user.
FIG. 9 is a diagram showing an example of user collecting information that is published on a website.

FIG. 8 is a diagram schematically showing a procedure for altering the traveling route of the autonomous vehicle 100 to the route including the riding section for the user. In the initial operation plan for the autonomous vehicle 100 shown in FIG. 8, similarly to FIG. 3, first, the autonomous vehicle 100, in which the parcels a, b have been loaded at the delivery center C, moves to the first spot A that is the delivery destination of the parcel a, and the parcel a is unloaded from the autonomous vehicle 100. Next, the autonomous vehicle 100 moves from the first spot A to the second spot B that is the delivery destination of the parcel b, and the parcel b is unloaded from the autonomous vehicle 100. Thereafter, the autonomous vehicle 100 returns from the second spot B to the delivery center C. Reference character P1 in FIG. 8 denotes a desired getting-in spot for the user, and reference character P2 in FIG. 8 denotes a desired getting-out spot for the user. Further, it is assumed that the user hopes to move from the desired getting-in spot P1 to the desired getting-out spot P2 at the time period of 9:00 to 9:30.

As shown in FIG. 8, the riding section (P1 to P2) desired by the user is not included in the traveling route of the autonomous vehicle 100. However, if the traveling route of the autonomous vehicle 100 is altered such that the autonomous vehicle 100 goes to the second spot B, goes to the desired getting-in spot P1 and desired getting-out spot P2 for the user in sequence, and returns to the delivery center C, the user can ride in the vacant space that is generated in the loading space 10 of the autonomous vehicle 100. That is, if a traveling section along which the autonomous vehicle 100 moves from the second spot B to the delivery center C is altered from the initial traveling section L3 to a traveling section L3' (a traveling section shown by a dashed-dotted arrow in FIG. 8) including the above riding section (P1 to P2), the user can rides in the vacant space that is generated in the loading space 10 of the autonomous vehicle 100. When the time of the arrival at the delivery center C is considerably delayed from the initial scheduled time (9:30) because the traveling section from the second spot B to the delivery center C is altered from the traveling section L3 to the traveling section L3', there is concern that the parcel delivery operation or the like is obstructed.

In response, in the modification, if the riding section (P1 to P2) is in a predetermined range from the traveling section L3, the vacant space management unit 2024 extracts the autonomous vehicle 100 as the vehicle in which the user rides. Then, the vacant space management unit 2024 sends a command to alter the traveling route from the traveling route including the traveling section L3 to the traveling route including the traveling route L3' and to cause the user to ride in the extracted autonomous vehicle 100 on the riding section desired by the user at the riding time desired by the user, to the extracted autonomous vehicle 100. The "predetermined range" herein is a range that is set such that the parcel delivery operation or the like is not obstructed even when the traveling route of the autonomous vehicle 100 is altered from the initial traveling route to the traveling route including the riding section for the user. Examples of the predetermined range include a range in which the distance between the initial traveling section L3 and the riding section (P1 to P2) is within a predetermined distance, a range in which the distance between the starting point (the second spot B) of the initial traveling section L3 and the desired getting-in spot P1 is within a predetermined distance and in which the distance between the ending point (the delivery center C) of the initial traveling section L3 and the desired getting-out spot P2 is within a predetermined distance, and a range in which an increase (a delay time of the time of the arrival at the delivery center C) in necessary time due to the alteration from the initial traveling section L3 to the new traveling section L3' including the riding section (P1 to P2) is within a predetermined time.

With the modification, in the case where the autonomous vehicle that meets the riding request from the user is not operating, it is possible to transport the user using the vacant space that is generated in the loading space 10 of the autonomous vehicle 100, while minimizing influence on the parcel delivery operation or the like.

In the example described in the modification, in the case where there is no autonomous vehicle 100 that meets the riding request from the user, the traveling route of the autonomous vehicle 100 is altered to the traveling route including the riding section desired by the user. However, the riding section for the user may be altered to a riding section on the traveling route of the autonomous vehicle 100.

Second Modification of Embodiment

The server device 200 may generate user collecting information based on the vacant space information table about each autonomous vehicle 100, when the server device 200 generates the vacant space information table, and may publish the generated user collecting information on a website. For example, the website herein is a website that is administered by a business operator that manages the operation of the autonomous vehicle 100 or a website that is administered by a delivery operator that gets a contract to deliver the parcel.

FIG. 9 is a diagram showing an example of the user collecting information that is published on the website. In the example shown in FIG. 9, the user collecting information has fields such as a vehicle ID field, a traveling section field, a time field and a riding capacity field. Information to be included in the user collecting information is not limited to the example shown in FIG. 9, and addition, alteration or deletion of a field can be performed when appropriate. In the vehicle ID field, information allowing the user to identify the individual autonomous vehicle 100 is registered. The information to be registered in the vehicle ID field may be the same information as the vehicle identification information to be registered in the vehicle ID fields in FIG. 4 and FIG. 5, or may be information that is separately set. In the traveling section field, information indicating the traveling section where the vacant space is scheduled to be generated in the loading space 10 of the autonomous vehicle 100 is registered. The information to be registered in the traveling section field may be character information indicating the positions of the starting point and ending point of the traveling section, or may be graphic information indicating a traveling section on a map. In the time field, information indicating the time when the autonomous vehicle 100 is scheduled to travel on the traveling section where the vacant space is scheduled to be generated in the loading space 10 is registered. The information to be registered in the time field may be information indicating a scheduled time of the departure from the starting point of the traveling section where the vacant space is scheduled to be generated in the loading space 10 and a scheduled time of the arrival at the ending point of the traveling section. In the riding capacity field, information indicating the number of users that can ride in the vacant space of the loading space 10 of the autonomous vehicle 100 is registered. The information to be registered in the riding capacity field is updated whenever the server device 200 accepts the riding request from the user.

When the user collecting information shown in FIG. 9 is published on the website, a general user can watch the user collecting information. Thereby, the user can know whether there is an autonomous vehicle 100 that meets a condition desired by the user. Then, if there is an autonomous vehicle 100 that meets the condition desired by the user, the user may give the riding request for the autonomous vehicle 100, to the server device 200. Even when there is no autonomous vehicle 100 that meets the condition desired by the user, the user may select an autonomous vehicle 100 that is most appropriate to the condition, and may give the riding request for the selected autonomous vehicle 100, to the server device 200. Thereby, it is possible to collect riding requests for the autonomous vehicle 100, from many and unspecified users. As a result, it is possible to more surely utilize the vacant space that is generated in the loading space 10 of the autonomous vehicle 100.

Others

The above embodiment is just an example, and the disclosure can be appropriately modified to be carried out, without departing from the spirit of the disclosure.

The processes and means described in the disclosure can be arbitrarily combined to be carried out, as long as the technical consistency is kept. Furthermore, a process described as a process to be executed by a single device may be executed by a plurality of devices in cooperation. Alternatively, processes described as processes to be executed by different devices may be executed by a single device. In the computer system, the hardware configuration to realize each function can be flexibly modified.

The disclosure can be realized also when an information processing program in which the functions described in the above embodiment are implemented is supplied to a computer and one or more processors included in the computer read and execute the information processing program. The information processing program may be provided to the computer by a non-transitory computer-readable storage medium that can be connected with a system bus of the computer, or may be provided to the computer through a network. The non-transitory computer-readable storage medium is a storage medium that can accumulate information such as data and programs by electric, magnetic, optical, mechanical or chemical action and that can be read from a computer and the like. Examples of the non-transitory computer-readable storage medium include an arbitrary type of disc such as a magnetic disc (a Floppy® disc, a hard disc drive (HDD), and the like) and an optical disc (a CD-ROM, a DVD disc, a Blu-ray disc, and the like), and a medium such as a read only memory (ROM), a random access memory (RAM), an EPROM, an EEPROM, a magnetic card, a flash memory, an optical card and a solid state drive (SSD).

What is claimed is:

1. An information processing device that manages an operation of an autonomous vehicle having a loading space in which a parcel is loaded, the information processing device comprising a control unit that executes:

acquiring operation plan information including a route along which the autonomous vehicle travels when the autonomous vehicle delivers the parcel, and a delivery time for the parcel;

acquiring vacant space information based on the operation plan information, the vacant space information including a traveling section where a vacant space is generated in the loading space of the autonomous vehicle, a time when the vacant space is generated in the loading space of the autonomous vehicle, and a size of the vacant space that is generated in the loading space of the autonomous vehicle when at least one parcel is disposed in the loading space;

causing the autonomous vehicle to travel based on the vacant space information; and when the control unit accepts a riding request or a delivery request from a user, extracting an autonomous vehicle that meets the riding request or the delivery request without changing the route included in the operation plan information, wherein the control unit executes:

accepting the riding request including a riding section and a riding time that are desired by the user; and extracting an autonomous vehicle based on the vacant space information, a traveling section where a vacant space is generated in the loading space of the extracted autonomous vehicle including the riding section, a time when the vacant space is generated in the loading space of the extracted autonomous vehicle including the riding time, and a size of the vacant space that is generated in the loading space of the extracted autonomous vehicle is a size allowing the user to ride in the extracted autonomous vehicle.

2. The information processing device according to claim 1, wherein:

the information processing device manages operations of a plurality of autonomous vehicles; and the control unit further executes accepting the riding request including a riding section and a riding time that are desired by the user, extracting an autonomous vehicle in which a vacant space having a size allowing the user to ride in the autonomous vehicle is generated in the loading space on the riding section at the riding time, based on the vacant space information about the autonomous vehicles, and sending a command to cause the user to ride in the extracted autonomous vehicle on the riding section at the riding time, to the extracted autonomous vehicle.

3. The information processing device according to claim 2, wherein when the control unit fails to extract the autonomous vehicle in which the vacant space having the size allowing the user to ride in the autonomous vehicle is generated in the loading space on the riding section at the riding time, the control unit executes extracting an autonomous vehicle from plurality of autonomous vehicle that travels in a predetermined range from the riding section at the riding time and in which the vacant space having the size allowing the user to ride in the autonomous vehicle is generated in the loading space, based on the vacant space information about the autonomous vehicles, and sending a command to alter a traveling route at the riding time to a route including the riding section and to cause the user to ride in the extracted autonomous vehicle on the riding section at the riding time, to the extracted autonomous vehicle.

4. The information processing device according to claim 2, wherein the control unit further executes generating user collecting information based on the vacant space information about the autonomous vehicles, the user collecting information traveling sections where vacant spaces are generated in loading spaces of the autonomous vehicles, times when the vacant spaces are generated in the loading spaces of the autonomous vehicles, and numbers of users that are able to ride in the vacant spaces that are generated in the loading spaces of the autonomous vehicles, and publishing the user collecting information on a website.

5. An information processing method for managing an operation of an autonomous vehicle having a loading space in which a parcel is loaded, the information processing method causing a computer to execute:

a step of acquiring operation plan information including a route along which the autonomous vehicle travels when the autonomous vehicle delivers the parcel, and a delivery time for the parcel;

a step of acquiring vacant space information based on the operation plan information, the vacant space information including a traveling section where a vacant space is generated in the loading space of the autonomous vehicle, a time when the vacant space is generated in the loading space of the autonomous vehicle, and a size of the vacant space that is generated in the loading space of the autonomous vehicle when at least one parcel is disposed in the loading space;

a step of causing the autonomous vehicle to travel based on the vacant space information; and when a riding request or a delivery request is accepted from a user, a step of extracting an autonomous vehicle that meets the riding request or the delivery request without changing the route included in the operation plan information, wherein accepting the riding request includes a riding section and a riding time that are desired by the user; and a step of extracting an autonomous vehicle based on the vacant space information, a traveling section where a vacant space is generated in the loading space of the extracted autonomous vehicle including the riding section, a time when the vacant space is generated in the loading space of the extracted autonomous vehicle including the riding time, and a size of the vacant space that is generated in the loading space of the extracted autonomous vehicle is a size allowing the user to ride in the extracted autonomous vehicle.

6. An information processing program for managing an operation of an autonomous vehicle having a loading space in which a parcel is loaded, the information processing program causing a computer to execute:

a step of acquiring operation plan information including a route along which the autonomous vehicle travels when the autonomous vehicle delivers the parcel, and a delivery time for the parcel;

a step of acquiring vacant space information based on the operation plan information, the vacant space information including a traveling section where a vacant space is generated in the loading space of the autonomous vehicle, a time when the vacant space is generated in the loading space of the autonomous vehicle, and a size of the vacant space that is generated in the loading space of the autonomous vehicle when at least one parcel is disposed in the loading space;

causing the autonomous vehicle to travel based on the vacant space information;

when a riding request or a delivery request is accepted from a user, extracting an autonomous vehicle that meets the riding request or the delivery request without changing the route included in the operation plan information;

accepting the riding request including a riding section and a riding time that are desired by the user; and extracting an autonomous vehicle based on the vacant space information, a traveling section where a vacant space is generated in the loading space of the extracted autonomous vehicle including the riding section, a time when the vacant space is generated in the loading space of the extracted autonomous vehicle including the riding time, and a size of the vacant space that is generated in the loading space of the extracted autonomous vehicle is a size allowing the user to ride in the extracted autonomous vehicle.

7. An information processing device that manages operations of a plurality of autonomous vehicles including a loading space in which a parcel is loaded, the information processing device comprising a control unit that executes:
acquiring operation plan information including a traveling route along which each of the autonomous vehicles is scheduled to travel when each of the autonomous vehicles delivers the parcel, and a delivery time for the parcel;
acquiring vacant space information based on the operation plan information, the vacant space information including a traveling section where a vacant space is generated in the loading space of each of the autonomous vehicles, a time when the vacant space is generated in the loading space of each of the autonomous vehicles, and a size of the vacant space that is generated in the loading space of each of the autonomous vehicles;
accepting a riding request including a riding section and a riding time that are desired by a user,
extracting an autonomous vehicle based on the vacant space information, a traveling section where a vacant space is generated in the loading space of the extracted autonomous vehicle including the riding section, a time when the vacant space is generated in the loading space of the extracted autonomous vehicle including the riding time, a size of the vacant space that is generated in the loading space of the extracted autonomous vehicle is a size allowing the user to ride in the extracted autonomous vehicle; and
sending a command to cause the user to ride in the extracted autonomous vehicle on the riding section at the riding time, to the extracted autonomous vehicle.

8. The information processing device according to claim 1, wherein, when the control unit accepts the riding request from the user, the control unit executes extracting an autonomous vehicle that is scheduled to travel on a traveling section including a riding section designated in the riding request.

* * * * *

UNITED STATES PATENT AND TRADEMARK OFFICE
CERTIFICATE OF CORRECTION

| | |
|---|---|
| PATENT NO. | : 11,643,114 B2 |
| APPLICATION NO. | : 16/787637 |
| DATED | : May 9, 2023 |
| INVENTOR(S) | : Koichi Suzuki et al. |

It is certified that error appears in the above-identified patent and that said Letters Patent is hereby corrected as shown below:

On the Title Page

Assignee item (73), please replace "TOYOTA JIDOSHA KABISHIKI KAISHA, Toyota (JP)" with -- TOYOTA JIDOSHA KABUSHIKI KAISHA, Toyota (JP) --

Signed and Sealed this
Fourth Day of July, 2023

Katherine Kelly Vidal
*Director of the United States Patent and Trademark Office*